(No Model.)
T. A. EDISON.
PHONOGRAM BLANK CARRIER.
No. 460,123. Patented Sept. 29, 1891.
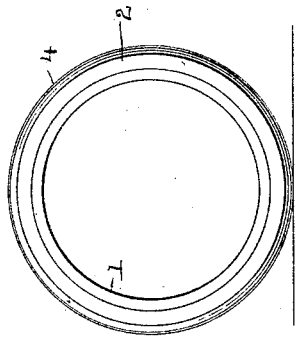
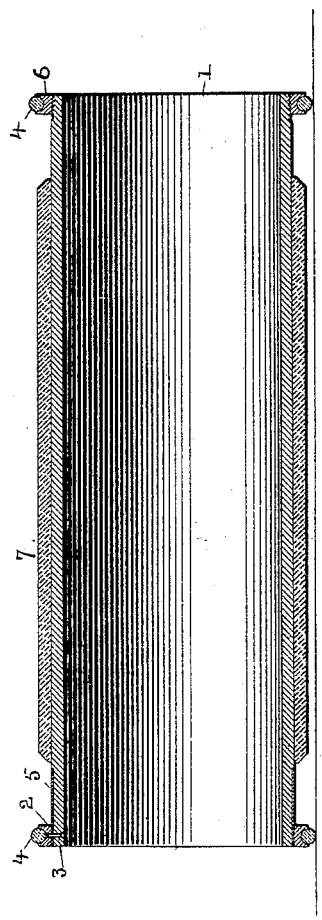
Witnesses
Geo. W. Breck
Edward Thorpe
Inventor
T. A. Edison,
By his Attorneys
Dyer & Seely.

UNITED STATES PATENT OFFICE.

THOMAS A. EDISON, OF LLEWELLYN PARK, NEW JERSEY.

PHONOGRAM-BLANK CARRIER.

SPECIFICATION forming part of Letters Patent No. 460,123, dated September 29, 1891.

Application filed November 21, 1890. Serial No. 372,231. (No model.)

*To all whom it may concern:*

Be it known that I, THOMAS ALVA EDISON, a citizen of the United States, residing at Llewellyn Park, in the county of Essex and State of New Jersey, have invented a certain new and useful Improvement in Phonogram-Blank Carriers, (Case No. 899,) of which the following is a specification.

My invention relates to devices for supporting and protecting phonogram-blanks or recording-surfaces on which a phonographic record has been or is to be recorded.

Phonogram-blanks are ordinarily made of wax or wax-like material, and this material is easily nicked or scratched by contact with rough or hard surfaces and is abraded by being rubbed against other surfaces, and such treatment so roughens the surface as to render it impossible to make a perfect record, or, if the record has already been made, to injure it. The object of this invention is to produce a carrier for the blanks which shall obviate or largely reduce the difficulty above indicated.

In the accompanying drawings, which illustrate the invention, Figure 1 is a longitudinal section through a carrier and the phonogram-blank thereon, and Fig. 2 is an end view of a carrier made in accordance with this invention.

1 is a cylinder of hard rubber or other material which is sufficiently rigid to stand the blows and strains to which it may be subjected and which is otherwise suitable for the purpose. The inner bore of the tube is made slightly tapering and of the proper size to fit the phonograph-cylinder with which it is intended to be used. When the phonogram-blank is to be used, it is not removed from the carrier, but the carrier itself is slipped onto the phonograph-cylinder. It is preferable to have the carrier somewhat longer than the blank, in order that the flanges will be so far removed from the ends of the blank that no part of the recorder or reproducer or the carrying devices therefor will touch the flanges as they approach the end of the blank. At each end of the cylinder is a flange. At the left in Fig. 1 the flange 2 is formed by a ring slipped onto the end of the tube and held in place by rivets or similar devices 3. Said ring is grooved around its periphery, and in the groove is held a soft rubber or other soft and elastic tire or ring 4. Around the end of the tube, under the ring 2 and preferably flush with the surface of the tube, is a strengthening-band 5. At the opposite end of the tube 1 the flange is formed by a screw-threaded ring 6, which fits on a screw-threaded portion of the tube. This ring is also grooved around its periphery and is provided with an elastic tire 4. This ring being removable, allows the blank to be slipped onto the carrier, after which the ring is put in place. 7 is the phonogram-blank in place on the carrier above described. It will be seen that the flanges at the end of the carrier, or at least the elastic tires 4, project from the surface of the carrier to a greater distance than the phonogram-blank, so that when the blank and carrier are laid upon a flat surface the blank will be entirely out of contact therewith, and that all wear caused by rolling or moving the blank around will be taken up by the carrier. It will be evident that it is not essential that the elastic tire 4 be used in just the form described. The same purpose would be served by elastic bearing-blocks at intervals around the flange. So, too, it is not essential that one of the flanges be permanently secured to the carrier as described, since both may be screw-threaded.

Having thus described the invention, what I claim is—

1. A phonogram-blank carrier consisting of a tube adapted to fit a phonograph-cylinder and having a flange at each end, substantially as described.

2. A phonogram-blank carrier consisting of a tube adapted to fit a phonograph-cylinder and having a flange at each end, one flange being removable, whereby a blank can be placed on or removed from the carrier, substantially as described.

3. A phonogram-blank carrier consisting of a tube adapted to fit a phonograph-cylinder and having a flange at each end, one flange being screw-threaded and fitting a screw-thread on the carrier, substantially as described.

4. A phonogram-blank carrier consisting of a tube adapted to fit a phonograph-cylinder and having a flange at each end, and elastic bearings on said flanges, substantially as described.

5. A phonogram-blank carrier consisting of a tube of rubber or other suitable material, a strengthening-ring at one end, a ring serving as a flange on the same end of the tube, and a flange at the opposite end, substantially as described.

6. The combination, with a phonogram-blank carrier having flanges at each end, of a phonogram-blank between the flanges and of less thickness than the flanges, substantially as described.

7. A phonogram-blank carrier consisting of a tube of rubber or other suitable material, and a flange or flanges mounted on the carrier and having elastic bearing-surfaces, whereby a blank supported on the carrier will be protected, substantially as described.

This specification signed and witnessed this 17th day of November, 1890.

THOS. A. EDISON.

Witnesses:
HARRY F. MILLER,
THOMAS MAGUIRE.